(12) United States Patent
Khoshatefeh et al.

(10) Patent No.: US 7,796,292 B2
(45) Date of Patent: Sep. 14, 2010

(54) INTERACTIVE SYSTEM AND METHOD FOR GRAPHICAL DOCUMENT GENERATION

(75) Inventors: Ramin Khoshatefeh, Cumberland, RI (US); Pavel A. Rabinovich, Assonet, MA (US); Michael P. Bodge, Taunton, MA (US); Mark P. Ramos, Taunton, MA (US)

(73) Assignee: Integrated Software Design, Inc., Boston, MA (US)

( * ) Notice: Subject to any disclaimer, the term of this patent is extended or adjusted under 35 U.S.C. 154(b) by 1084 days.

(21) Appl. No.: 10/354,828

(22) Filed: Jan. 3, 2003

(65) Prior Publication Data

US 2004/0133846 A1    Jul. 8, 2004

(51) Int. Cl.
G06K 15/00    (2006.01)

(52) U.S. Cl. .................................... 358/1.18; 358/1.15

(58) Field of Classification Search ................ 358/1.15, 358/1.9, 1.13, 1.16, 1.18; 705/1; 347/101
See application file for complete search history.

(56) References Cited

U.S. PATENT DOCUMENTS

| | | | | |
|---|---|---|---|---|
| 6,275,301 | B1 * | 8/2001 | Bobrow et al. | 358/1.2 |
| 6,982,808 | B1 * | 1/2006 | Ogg et al. | 358/1.18 |
| 2002/0152093 | A1 * | 10/2002 | Chalmers et al. | 705/1 |
| 2003/0112306 | A1 * | 6/2003 | Simpson et al. | 347/101 |
| 2003/0140315 | A1 * | 7/2003 | Blumberg et al. | 715/527 |

OTHER PUBLICATIONS http://www.taltech.com/TALtech_web/products/activex_barcodes.html; http://www.barcodeactivex.com.
http://www.hallogram.com/objactxctrl/index.html.
http://www.tharo.com/nwletter.htm; http://www.barcodeproducts.com/html/Barcoding_Software//easy32.htm.
http://www.softpile.com/Development/ActiveX/Review_02206_index.html.
http://www.barcodestore.com/software/loftware/.
http://www.barcodestore.com/software/smartscan/.
http://www.barcodestore.com/software/bartendr/pro-integration/.
http://www.barcodestore.com/software/dsx/xbarcode/.
http://www.barcodestore.com/software/wasp/activex/.
http://www.programfiles.com/Default.asp?Catld=942.
http://www.frontlinetoday.com/frontline/content/contentDetail.jsp?id=40736.
http://www.dpexchange.net/DPEXSolutions.asp.

* cited by examiner

*Primary Examiner*—Edward L Coles
*Assistant Examiner*—Vu B Hang
(74) *Attorney, Agent, or Firm*—Sampson & Assoc., P.C.

(57) ABSTRACT

A system and method is provided for generating customized documents, such as labels, in a client-server computing environment. A server is communicably accessed by a client, which then retrieves a dynamic link library module configured for use by a client-based application. The client also retrieves an ActiveX control module configured for controlling operational aspects of the application; and retrieves a document structure file. The application generates a document using the dynamic link library and the label structure file. A user may then modify the document using the ActiveX control module, and print the document.

25 Claims, 8 Drawing Sheets

```
ENTER PROMPT DATA
┌─────────────────────────────────────────────────────────┐
│  PART NO. BARCODE         14015248                      │
│  QUANTITY BARCODE         900                           │
│  SUPPLIER BARCODE         046068722                     │
│  SERIAL BARCODE           1284                          │
│  COMPANY INFO TEXT        XYZ COMPANY, INC. ROMULUS, MI 48174 │
│                                                         │
│       [ PRINT ]     [ PREVIEW ]     [ CANCEL ]          │
└─────────────────────────────────────────────────────────┘
```

INTERACTIVE SYSTEM AND METHOD FOR GRAPHICAL DOCUMENT GENERATION

BACKGROUND

1. Technical Field

This invention relates to a system and method for accessing, transporting, viewing, interacting with, and printing pre-formatted graphics-laden documents over a distributed computer network.

2. Background Information

Bar coded labels, signs, coupons, tickets, forms, or other pre-formatted, graphics-laden documents (collectively referred to herein as 'documents'), are an integral part of many businesses and business systems. These documents are commonly used for event admission, product identification, display, reimbursement, shipment, returns, redemption, receipt and return of goods.

Currently, such documents may be presented in a business system operating in a distributed network as graphical images in various graphical formats, such as GIF, TIFF, JPEG, BMP, PDF and more. However, these images are fixed and non-interactive. Any user-directed changes to these images generally require that the changes to be submitted to the application running on the server and that the image be re-drawn at the host computer server or at the host web server and re-transmitted back to the client workstation, where the client can then use an application software on the client or a browser running on the client to view and print the image.

A need therefore exists for a system and method that provides the ability to dynamically change or otherwise interact with part or all of the elements/objects within such a document, at the client level, rather than at the remote network's server node.

SUMMARY

An aspect of the present invention includes a method for generating customized labels in a client-server computing environment. The method includes communicably accessing a server with a client; retrieving a document editing application from the server; retrieving a dynamic link library module configured for use by a client-based application; retrieving an ActiveX control module configured for controlling operational aspects of the application; and retrieving a label structure file. The method also includes generating a label using the application, the dynamic link library, and the label structure file; interacting with the label, using the ActiveX control module; and printing the label.

Another aspect of the invention includes a computer implemented method in an interactive medium for generating customized graphical documents. The method includes communicably accessing a server with a client; opening a client-based application; retrieving document information from the server; and retrieving from the server, an ActiveX control module configured for controlling operational aspects of the application. The method also includes, at the client, generating a graphical document with the application, the dynamic link library, and the graphical document information; interacting with the graphical document at the client, using the ActiveX control module; and printing the graphical document.

A still further aspect includes a computer implemented method in an interactive medium for generating customized interactive graphical documents. The method includes loading a graphical document information file on a server; loading on the server, a dynamic link library module configured for use by a client-based application; loading on the server, an ActiveX control module configured for controlling operational aspects of the application; and communicably coupling the server to a client. The method also includes transmitting the dynamic link library module to the client; transmitting the ActiveX control module to the client; and transmitting the graphical document information file to the client. Additional steps include configuring the dynamic link library, and the graphical document information file, to interoperate with a client-based application for generating a graphical document at the client; and configuring the ActiveX control module to enable interaction with the graphical document at the client.

In a yet further aspect, the present invention includes a computer implemented method in an interactive medium for generating customized graphical documents. The method includes communicably coupling a server to a client; transmitting a dynamic link library module to the client; and transmitting a graphical document information file to the client. The dynamic link library, and graphical document information file, are configured to interoperate with a client-based application for generating a graphical document at the client. The method also includes transmitting an ActiveX control module to the client, the ActiveX control module being configured to enable interaction with the graphical document at the client.

In yet another aspect, the invention includes a computer system in an interactive medium for generating customized graphical documents. The system includes a server having a graphical document information module configured for being transmitted to a client; a dynamic link library module configured for being transmitted to the client; an ActiveX control module configured for controlling operational aspects of a client-based application, and which is configured for being transmitted to the client; and a client communicably couplable to the server. The client is configured to download the dynamic link library module, the ActiveX control module, and the graphical document information file; operate the application, the dynamic link library module, the ActiveX control module, and the graphical document information file, to generate a graphical document; and operate the ActiveX control module to enable modification of the content of the graphical document.

In another aspect, the invention includes a computer system in an interactive medium for generating customized graphical documents. The system includes a server being communicably couplable to a client. The server includes a graphical document information module configured for being transmitted to the client; a dynamic link library module configured for being transmitted to the client; and an ActiveX control module configured for controlling operational aspects of a client application and configured for being transmitted to a client.

The present invention also includes a computer system in an interactive medium for generating customized graphical documents, the system including a client communicably couplable to a server. The client includes a dynamic link library module; an ActiveX control module; a graphical document information file; and an application configured to interoperate with the dynamic link library module, the ActiveX control module, and the graphical document information file, to generate a graphical document. The ActiveX control module is configured to enable modification of the content of the graphical document at the client.

BRIEF DESCRIPTION OF THE DRAWINGS

The above and other features and advantages of this invention will be more readily apparent from a reading of the following detailed description of various aspects of the invention taken in conjunction with the accompanying drawings, in which.

DETAILED DESCRIPTION

Referring to the figures set forth in the accompanying drawings, the illustrative embodiments of the present invention will be described in detail hereinbelow. For clarity of exposition, like features shown in the accompanying drawings shall be indicated with like reference numerals and similar features as shown in alternate embodiments in the drawings shall be indicated with similar reference numerals.

As used herein, the term 'distributed network' refers to a client server network, a thin client network such as the world wide web on the internet, or an internal intranet within an organization. Such a distributed network generally includes a server computer referred to herein as 'server' and a client workstation computer referred to herein as 'client'. Application software typically runs on the server and a client application or a browser typically runs on the client workstation communicating with the server software.

Embodiments of the present invention include an on-line document-handling (e.g., labeling) Internet site on the World Wide Web, which offers convenient document generation services in a distributed network (e.g., thin client in the case of the Web and Internet) environment. Particular embodiments of the site serve as a platform to publish, communicate and access packaging and labeling information for internal and external enterprise-wide compliance. For example, manufacturers, suppliers, and/or other subscribers (i.e., at the client level) may easily and accurately produce labels that conform to standards that have been uploaded to the site (i.e., at the server level), by a publisher, such as manufacturers, distributors or retail chains for compliance in regards to shipping goods or returned merchandise. Publishers may generate and upload their unique label configurations to the site using a format that advantageously occupies a relatively small footprint, and facilitates manipulation by a user. Subscribers thus may relatively easily and quickly download the label configuration, manipulate information contained therein, and use it to generate output on nominally any printer via a conventional PC workstation and an Internet Browser. Thus, subscribers may generate and print labels, and the like, simply by choosing the appropriate label configuration, which is then downloaded automatically from the server to the client, viewing it, and filling in any variable information.

Variable information may include various user-defined (i.e., publisher-defined) information such as label size, return address, tracking number, and carton numbers, etc.

Optionally, other items such as Purchase Order numbers, Invoice numbers, and etc. with any other related information, may be uploaded to the site by the publisher, and downloaded by the subscriber along with the label configuration information. The site thus enables publishers to quickly update their labels, to provide a convenient means for ensuring that label configurations remain in compliance.

Figure 1:
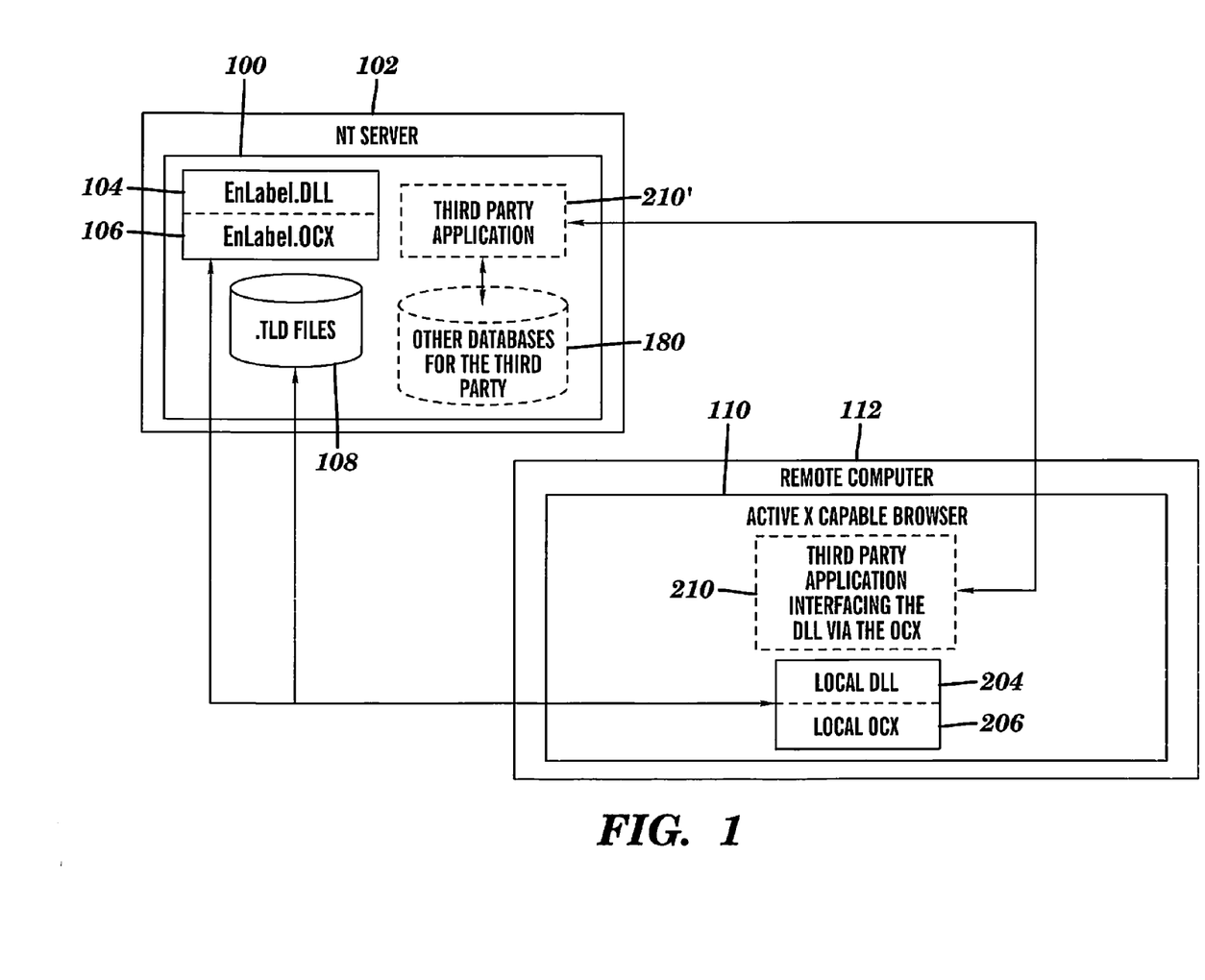
FIG. 1 is a functional block diagram of an embodiment of the present invention.

Referring to FIGS. 1-8, exemplary embodiments of the present invention are shown and described. Turning to FIG. 1, particular embodiments of the present invention include a client 112/server 102 configuration including a server site 100 that allows substantially any client application 110, 210 which is compatible with Microsoft® ActiveX technology, to load, display, interact with, and print signs, labels, coupons, tickets, forms, or other similar documents. Application 110 may include a conventional browser (e.g., Microsoft® Internet Explorer® or Netscape® browser), which makes use of embodiments of this invention to load, access, view, set up and print these documents through the browser's graphical user interface. Optionally, as shown in phantom, an application 210 may be used, which may either be based-upon (e.g., running on top of) a browser) 110, or may be nominally any other stand-alone program that is compatible with ActiveX technology, such as described in greater detail hereinbelow.

As shown, site 100 is hosted on a server 102, such as one running the Microsoft® NT platform. Site 100 includes a DLL (Dynamic Link Library) module 104, a control module (also referred to as an "OCX" or "Active X" module) 106, and a graphical document information module, which in this embodiment includes a collection of document structure modules (or "TLD") 108.

The DLL module 104 performs graphical rendering of a desired document, loading and saving of files containing the document, printing of the document, and many other functions that permit manipulation of the document. This module may be embodied in software, such as written in any desired high-level programming language such as the C++ programming language. Alternatively, module 104 may be embodied in hardware or combinations of hardware and software, without departing from the spirit and scope of the present invention. Further, an electronic image of this module, 104, is transferred to the remote computer 112, automatically one time only when the remote computer and client access the server for the first time. Thereafter, all the graphical rendering and processing as described above takes place at the client on the remote computer without relying on the server.

Document Structure (TLD) module 108 is typically a software file containing the structure of the desired document (e.g., label, forms, signs, and etc.), which allows for incorporation of various types of objects within the document. The various objects may include text, bar codes, lines, boxes, drawings, pictures, logos and fixed and dynamic data stored in various forms within the document. In exemplary embodiments, module/file 108 may be disposed in the .TLD (Tattoo Label Design) format commonly used by the Tattoo ID® label-making software available from Integrated Software Design, Inc. (Mansfield, Mass.). The .TLD format is configured to contain graphical components, logic, and user-defined data elements to provide a convenient and compact mechanism for efficiently transmitting components (graphical and logic) which effectively define the graphical document in a manner that permits aspects of the document to be pre-defined, while permitting other aspects to be modified by the user at the client level, so that the document may be selectively modified and displayed/rendered at the client on multiple devices, independently of the server. In these embodiments, the collection of .TLD files 108 associated with particular documents 112 (FIG. 2) are created (e.g., remotely by a publisher) using the Tattoo ID® label-making software, and uploaded to server 102 for use in the present invention. As mentioned hereinabove, although the documents are labels in the examples shown herein, substantially any type of document capable of being defined in the .TLD format, including signs, tickets, coupons, forms, and the like, may be used in connection with the present invention.

Moreover, although the .TLD format is described herein, the skilled artisan will recognize that substantially any format capable of containing the structure of the desired document, and allowing for incorporation of various types of objects within the document, may be used without departing from the spirit and scope of the present invention.

In alternative embodiments, the graphical document information module may include data that is retrieved from an optional database 180 (shown in phantom) which may be used in conjunction with the .TLD module 108 to retrieve and incorporate variable information for the .TLD document, thereby offering open connectivity to populate .TLD files with dynamic data from other third party application and databases. In these embodiments, other (e.g., developed by third parties) applications 210, as also shown in phantom, may be equipped (e.g., may incorporate the appropriate specifications used by the TattooID® software) to enable them to generate their own variable data to populate .TLD files. These applications may be resident on the server 100, downloaded from other connected servers, or communicated with via an interface between them and the server 100 for the purpose of transporting data from other remote server to the server 100 or databases 180. Applications 210 may include programs developed by third parties, including those written in Visual Basic (VB), Visual C (VC), ASP (Active Server Pages) or any compatible development tool. Moreover, most applications developed by Microsoft® Corporation provide support for OLE, and thus may integrate with ActiveX Control 106, 206. Nominally any of these applications that are configured to communicate with ActiveX components via OLE, may pass data back and forth to a document 108 via XML or a comma delimited file, to effectively operate in the context of the present invention. Operational details of such embodiments including an application 210, are discussed in greater detail hereinbelow.

Control module 206 offers an interface that may be called by client applications 110, 210 to enable them to access the functionalities of DLL 204. In exemplary embodiments, module 206 is an ActiveX component developed in C++, which conveniently interfaces with substantially any application that supports ActiveX controls, i.e., any application that supports OLE (Object Linking and Embedding) such as Microsoft® Internet Explorer® or the Netscape® browser.

Figure 2:
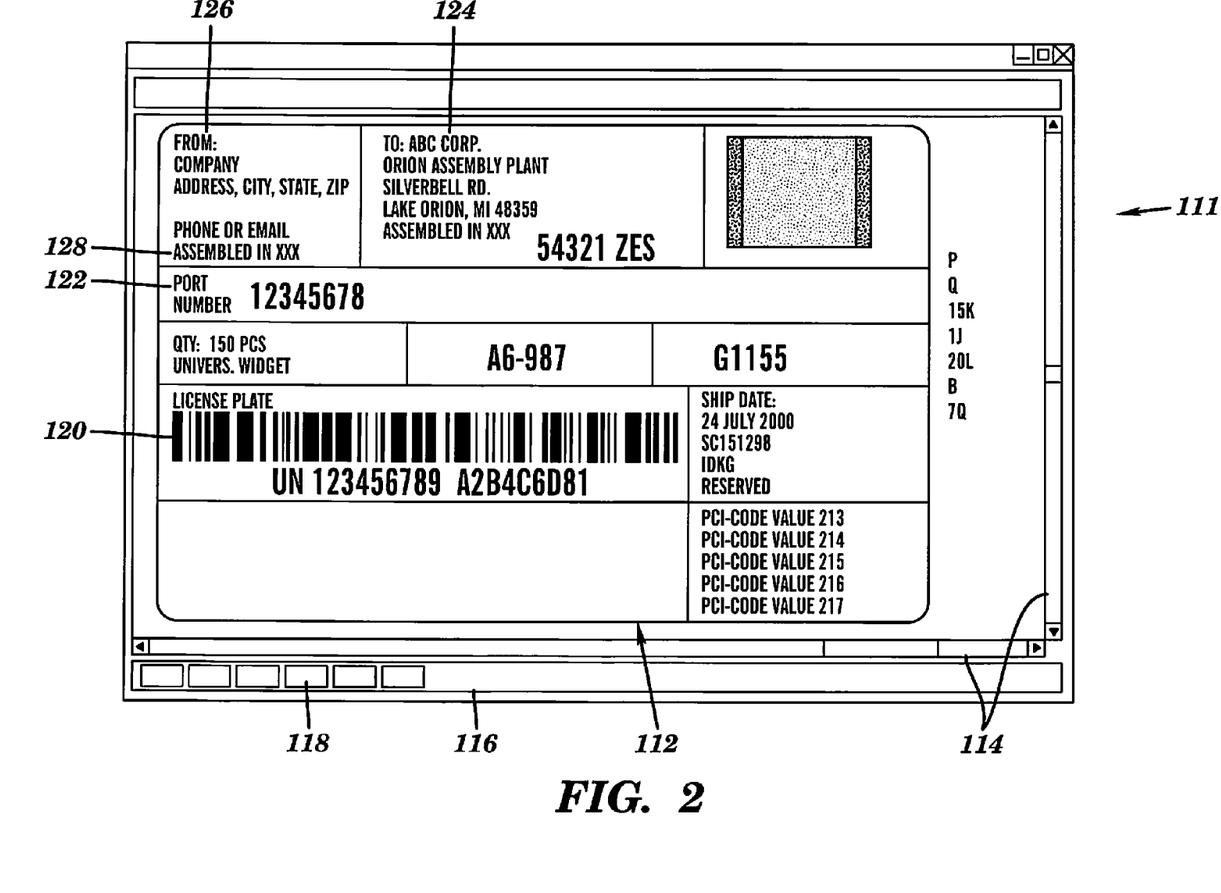
FIGS. 2-8 are screen displays generated during operation of various embodiments of the present invention.

In particular embodiments, module 206 provides applications with various functions and properties that may be selectively accessed by the user using an on-screen display (window) 111 to communicate or otherwise interact with a document, such as shown in FIG. 2. Exemplary functions include the ability to load and display documents, disable or enable tool button controls (e.g., zoom in/zoom out), retrieve or update information in documents being displayed, and print documents.

Moreover, the user may adjust various parameters of display 111, such as height, width, appearance and location, to customize the look and feel of the display within the application.

Examples of properties and custom functions that may be adjusted using the ActiveX control module 206 are included in the following Tables 1 and Table 1A.

TABLE 1

Height/Width: The height or width, in points, of an object.
The Height and Width properties are automatically updated when a user moves or sizes a control. When a user changes the size of a control, the Height or Width property stores the new height or width. If a user specifies a setting for the Left or Top property that is less than zero, that value will be used to calculate the height or width of the control, but a portion of the control may not be visible on the HTML Layout.
If a user moves a control from one part of an HTML Layout to another, the setting of Height or Width changes only if the user sizes the control as it is moved. The settings of the control's Left and Top properties will change to reflect the control's new position relative to the edges of the HTML Layout that contain it.
The value assigned to Height or Width must generally be greater than or equal to zero. For most systems, the recommended range of values is from 0 to +32,767. Higher values may also work depending the system configuration.
Visible: Specifies whether a control is visible or hidden.
To hide an object at startup, the Visible property may be set to 'False' at design time. Setting this property in code enables a control to be hidden and later redisplayed at run time in response to a particular event.
All controls are visible at design time.
Codebase:
The CodeBase property makes it possible to automatically download ActiveX controls from a server to a user's machine.
The CodeBase property supports the following file types:
PE (portable executable): The PE (for example, .ocx, .dll, .exe) is downloaded, installed, and registered automatically if the control is not already registered on the user's computer. This is the simplest way to package a single-file ActiveX control, but it does not use file compression and isn't platform independent except with HTTP.
.cab (cabinet): The .cab file contains one or more files, all of which are downloaded together in a single compressed cabinet file. One file in the cabinet is an .inf file providing further installation information. The .inf file may refer to files in the .cab as well as to files at other URLs.
.inf (installation information): The stand-alone .inf file specifies various files that need to be downloaded and set up for an .ocx to run. The syntax of the .inf file supports URLs pointing to files to download as well as platform independence (by enumerating files for various platforms). This mechanism provides platform independence for non-HTTP servers.
ID: Specifies the name of a control or an object, or the name of a font to associate with a Font object.
Left/Top: The distance between a control and the left or top edge of the HTML Layout that contains it
TabStop: Indicates whether an object can receive focus when the user tabs to it.
The TabStop property is generally set at design time.
TabIndex: Specifies the position of a single object in the HTML Layout's tab order. The index value of the first object in the tab order is typically zero.
bControlInitialized: Flag to indicate that the control is initialized and ready to load documents. This property is set by the control itself and should be checked to see if it is set prior to loading any labels to it.
pszTLDFileName: Path name of the document to be loaded into the control. This property may be used to specify the default label to load in the control during startup.

TABLE 1A int Open (String filename)
    Return Value: Returns 1 if the file was opened successfully, otherwise 0
    Parameters: filename - path of local file and or remote file URL to be opened
    Remarks: Opens the file specified and displays it in the control
int GetFileInfo(XMLString & fileInfo)
Return Value: Returns 1 if successfully obtained information about the label, otherwise 0
Parameters: fileInfo - XML formatted string with retrieved information about the label. Reference **XML DTD below for the file format.

TABLE 1A-continued

```
int SetFileInfo(XMLString fileInfo, int nMask)
Return Value: Returns 1 if successfully updated information about the
label, otherwise 0
Parameters: fileInfo -XML formatted string with updated information
about the label. Reference **XML DTD below for the file format.
UpdateFileInfo (fileInfo)
int EnableControls (int nMask)
Return Value: Returns 1 if successfully updated controls information,
otherwise 0
Parameters: nMask - the mask that determines which controls to enable
and which ones to disable.
            TID_CTRL_PRINT - (1)
            TID_CTRL_OPEN - (2)
            TID_CTRL_ZOOM_IN - (4)
            TID_CTRL_ZOOM_OUT - (8)
            TID_CTRL_PRINT_SETUP - (16)
int ZoomLabel (float Scale)
Return Value: Returns 1 if the operation completed successfully,
otherwise 0
Parameters: Scale - new scaling factor to be used for label drawing
Remarks: ZoomLabel function proportionally enlarges or shrinks
currently loaded label to specified scaling factor. Scaling only
affects the way the label is displayed on the screen and has no affect
on the way the label is printed.
int PrintLabel( )
Return Value: Returns 1 if the operation completed successfully,
otherwise 0
Parameters: - none -
Remarks: Displays Tattoo ID print dialog on the screen (See the
diagram). From the dialog the user has a choice of configuring and
printing currently loaded label or canceling the print job.
```

Client computer 112 is communicably coupled, for example via the Internet or an Intranet (or via dedicated link), to server 102. As mentioned hereinabove, client 112 includes at least one application 110, 210 running thereon, which is compliant with the control protocol of control module 106 and 206 as discussed hereinabove. As also shown, client 112 includes local copies 204, and 206 of DLL and OCX modules 104 and 106, respectively.

Operation of various embodiments of the present invention is shown and described with respect to FIG. 1 and the following Table 2.

TABLE 2

| | |
|---|---|
| 209 | Site or application checks for updated local version of DLL/OCX |
| | 211 Optionally check for document editing application 210 |
| | 213 If not found, optionally download application 210 |
| 212 | If updated local DLL/OCX not found, then download |
| 214 | Local OCX retrieves copy of document info from site (.TLD and any data) |
| | 215 Optionally generate prompt screen(s) for selecting or imputing document reference(s) |
| | 217 Optionally drill down to desired document |
| 216 | Generate/display document in window 111 (by calling OCX 206) |
| 218 | Interact with document using local OCX 206 |
| 220 | Enter Variable Information |
| | 221 Optionally Generate prompt screen |
| 222 | Print document |
| | 224 Optionally generate reports (e.g., activity, billing) |

During operation, once application (e.g., browser or other compliant application) 110 logs for access onto server site 100, it may check 209 for local copies of DLL and OCX modules 104 and 106. If one or more of the components 204 and 206 are not found (or an older version of the component is found) locally, then application 110, 210 downloads 212 the latest DLL/OCX modules 104, 106 from the server 102.

Figure 4:
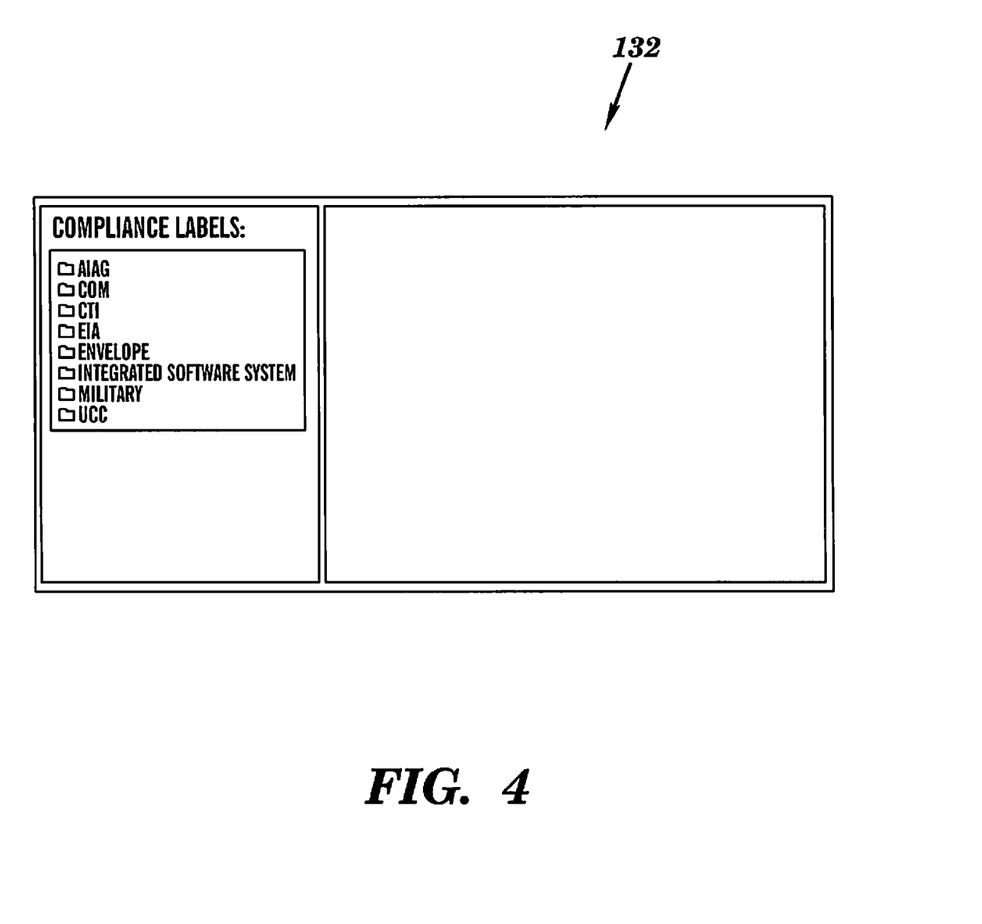
Figure 5:
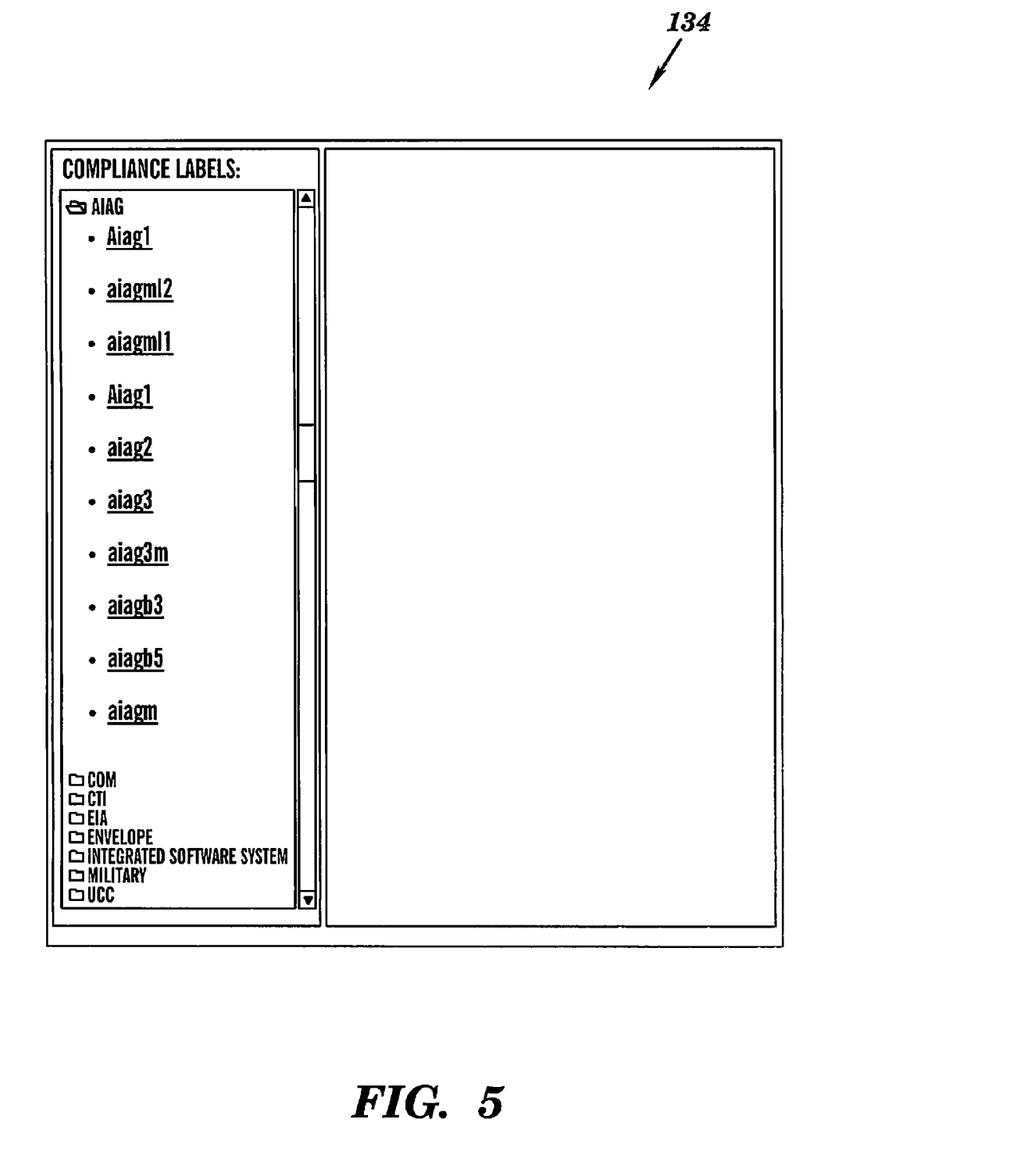
Figure 6:
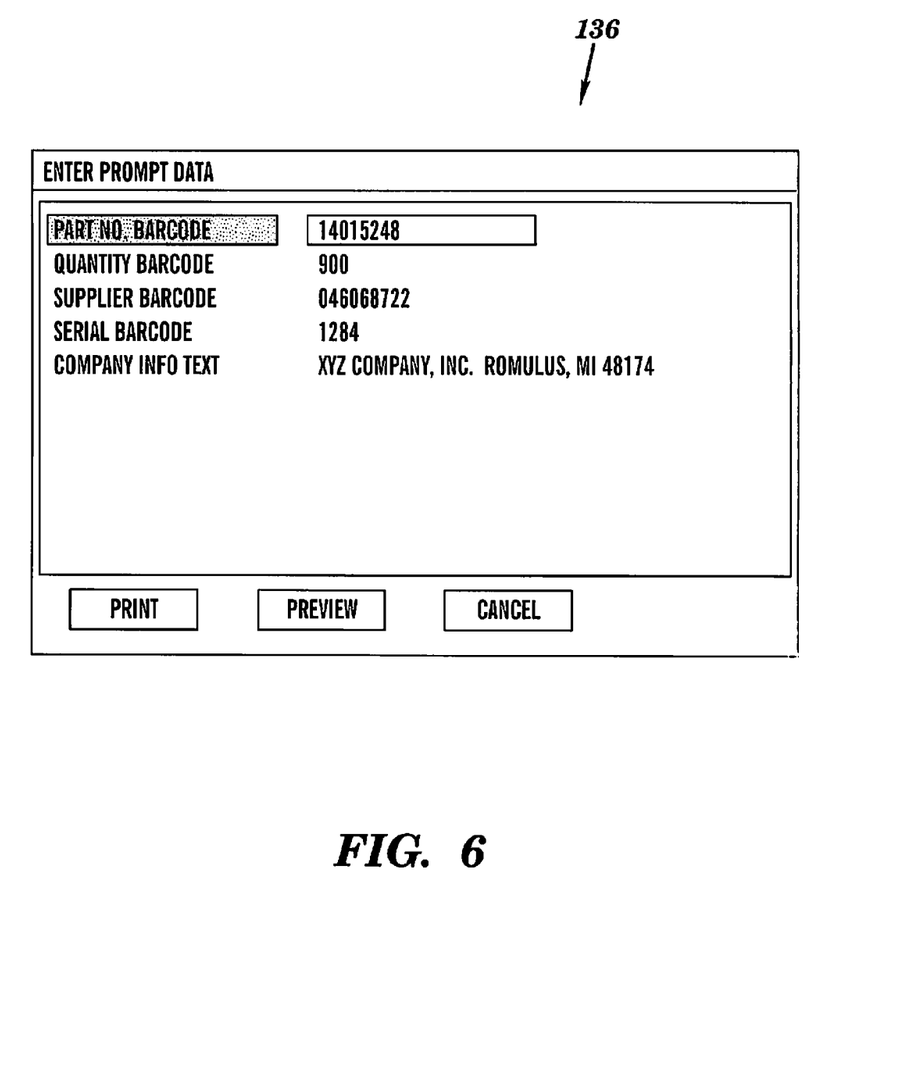
Figure 7:
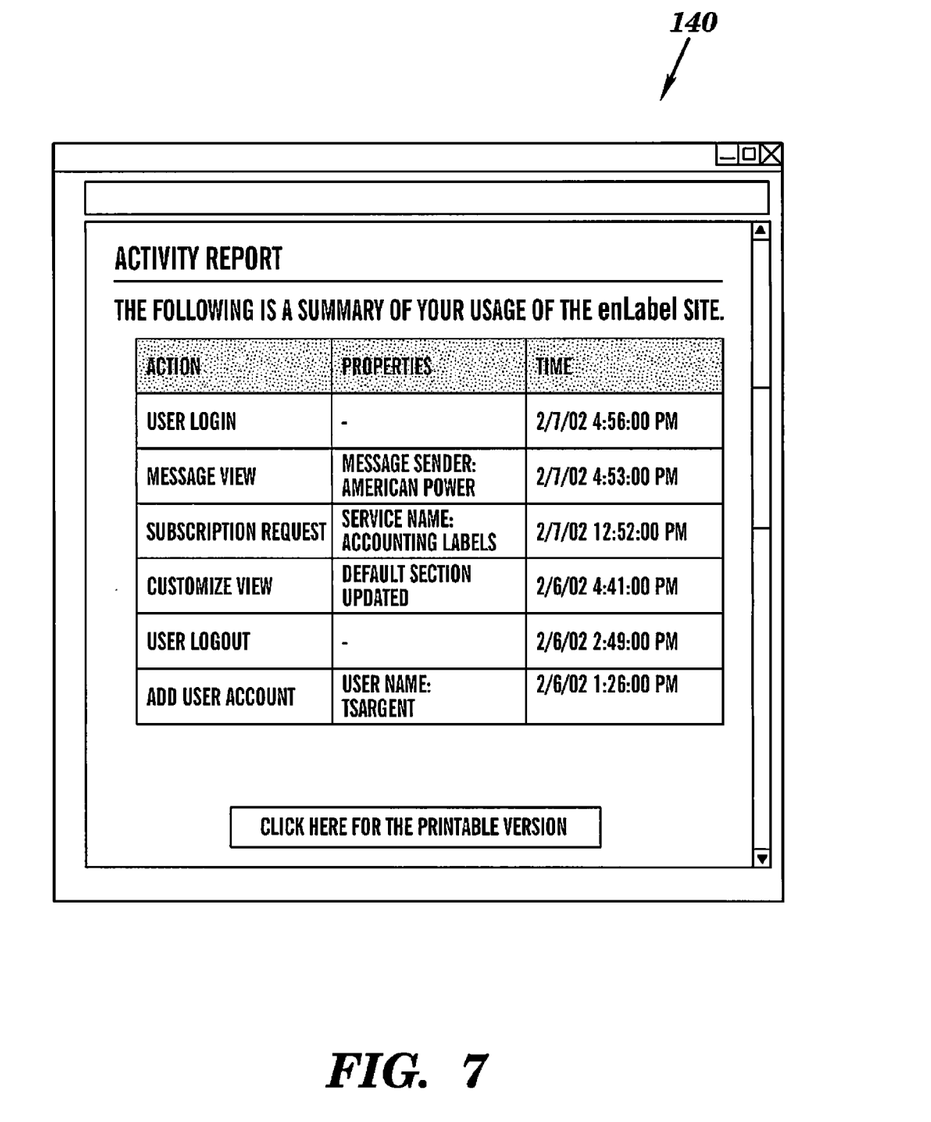

Application 110 may then instruct local OCX 206 to retrieve 214 a document (e.g., its corresponding .TLD file 108) from site 100. This may be accomplished by optionally selecting 215 documents of a desired type (e.g., 'Compliance Labels', 'Library', or documents posted by a particular publisher), shown in a graphical display 132 (FIG. 4). The user may then drill down 217 to a particular document, such as by selecting a folder shown at 134 in FIG. 5. Application 110 may then generate/display 216 the selected document, using it's .TLD file 108 in combination with DLL module 204, such as shown in FIG. 2. As also shown in FIG. 2, exemplary label 112 includes various information provided by the publisher (e.g., by uploading to server 102), such as a bar code 120, part number 122, and "Ship to" information 124.

The application also enables the user to interact 218 with the document, e.g., using functions and commands provided by control module 206. For example, as best shown in FIG. 2, control module 206 enables application 110, 210 to generate a display 110 which includes scrollbars 114, and toolbar(s) 116 with tool icons 118 to provide functions such zoom in/out, preview, and print, such as by using ActiveX controls.

The user may also interact 218 with the ActiveX window 111 to shrink or enlarge the document 112, print the document, or modify the position of the printed document on label stock prior to printing. The user may also interact with the document 112 by entering 220 or otherwise changing any data dynamically and view the results in the window 111 without having to go back anywhere (i.e., without having to go back to server site 100) to retrieve data. For example, variable information, such as shipper's address 126, and assembly location 128, may be entered 220 automatically, or semi-automatically (e.g., by selecting data from a database exchange) and/or by specific user input (e.g., keystroke, stylus, etc.). Optionally, application 110, 210 may generate 221 a prompt screen 136 (FIG. 6) including a list of fields to prompt the user to enter desired variable information.

This merging of data, re-formatting, and re-imaging, are thus accomplished dynamically in real-time at the client 112 within the application 110. As used herein, the term 'real-time' refers to actions taking place on the client, at speeds nominally limited only by the processing capacity of the local client machine.

Figure 3:
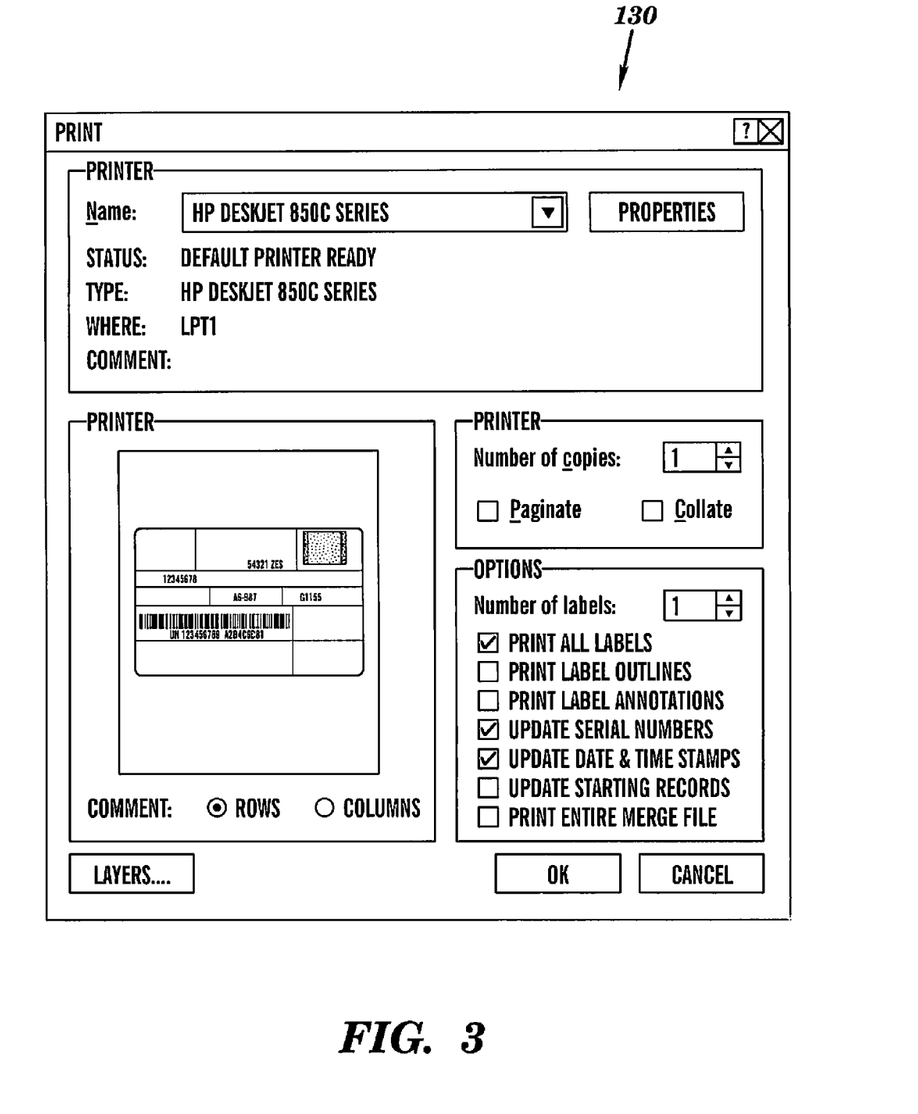

Once complete, the user may print 222 the document. As best shown in FIG. 3, application 110, 210 generates a print dialog screen 130 which enables the user to select various conventional print parameters to configure and print the currently loaded label, or cancel the print job.

Figure 8:
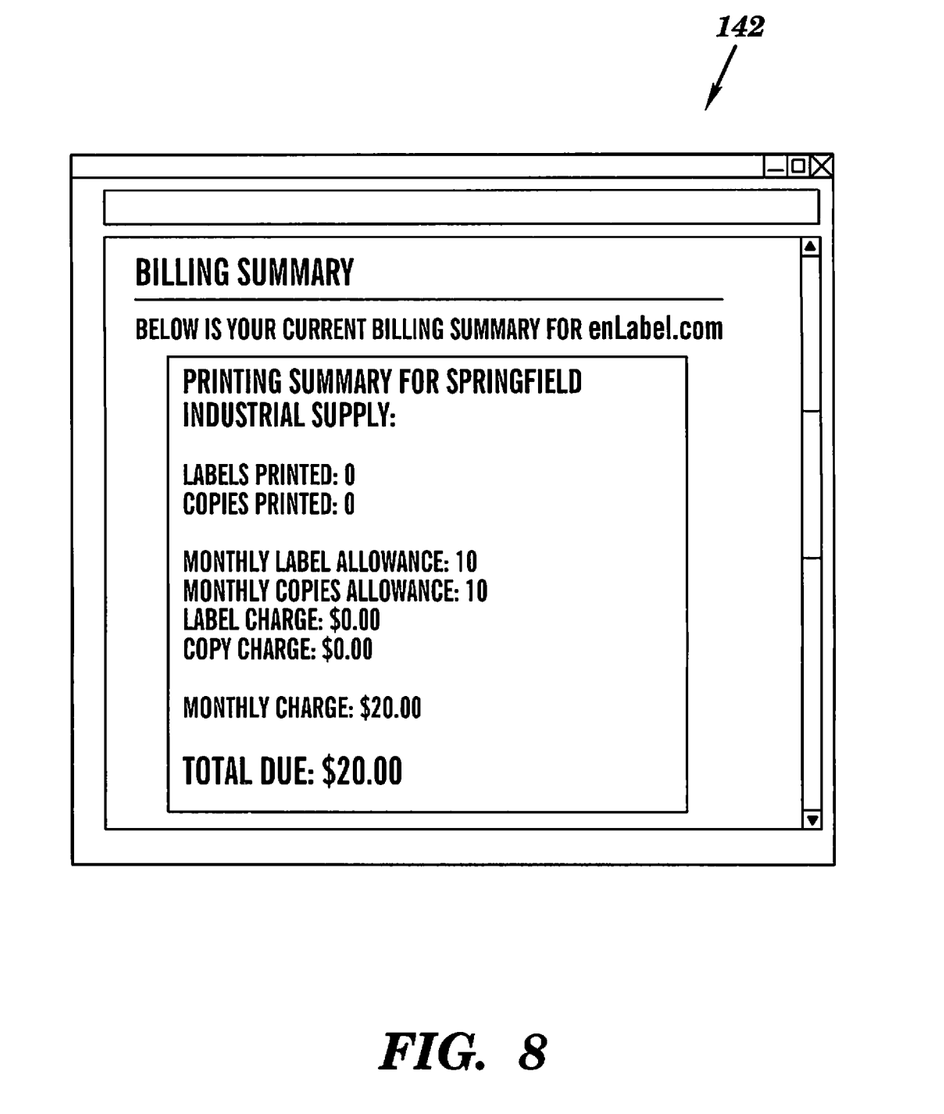

Users at either the level of client 112 or server 102 may also optionally generate 222 reports, such as an activity report 140 (FIG. 7) and/or a billing report 142 (FIG. 8).

In an alternate embodiment of the present invention, client 112 may include a dedicated application 210, which has the capability of generating .TLD files as discussed hereinabove.

Operation of this embodiment, including application 210, is in many respects similar or identical to the operation of application 110 discussed hereinabove, except for the following differences. As mentioned hereinabove, application 210 may reside on client 112, and optionally, the site 100 may check 211 with the client to ensure presence of an updated version of application 210. If not found, a copy 210' of the application may be downloaded 213 from site 102 to client 112.

After checking 209 and/or downloading 212 a copy of the DLL/OCX, the application 210 (e.g., written in VB or any other compatible language) may retrieve 214 document information (i.e., data) from database (e.g., Oracle®, SQL®, Access®, etc.) 180 of the site 100. Such document information may be properly identified by generating 215 one or more prompt screens 132 (FIG. 4) configured to elicit reference(s) such as document/label name, part number, etc., from the user.

Program 210 may then call ActiveX control module 206 passing it the document/label name and the data retrieved from database 180 (e.g., in XML format). ActiveX module 206 may then take the combined data and generate a document 112 (e.g., generate a .TLD file) and display it 216 in a window 111 (FIG. 2). The document may then be manipulated and printed as discussed hereinabove.

The foregoing describes customized document generation in a networked computer environment. Although the exemplary environment discussed hereinabove is that of a thin client or client-server, the skilled artisan will recognize that peer-to-peer networked computers and any variation thereof may be used without departing from the spirit and scope of the present invention.

In the preceding specification, the invention has been described with reference to specific exemplary embodiments thereof. It will be evident that various modifications and changes may be made thereunto without departing from the broader spirit and scope of the invention as set forth in the claims that follow. The specification and drawings are accordingly to be regarded in an illustrative rather than restrictive sense.

Having thus described the invention, what is claimed is:

1. A method for generating customized labels between a client computer and a server, said method comprising:
(a) with the client computer, communicably accessing a server;
(b) retrieving a document editing application from the server;
(c) retrieving a dynamic link library module configured for use by a client-based application;
(d) retrieving an ActiveX control module configured for controlling operational aspects of the application;
(e) retrieving a document structure file in the Tattoo Label Design (.TLD) format, the .TLD format being configured to contain graphical components, user-defined formula logic, and user-defined variable content data elements, the user-defined formula logic including logic for translation of data, wherein data is translated between formats selected from a group consisting of English and foreign languages, monetary units, units of measurements, symbols and combinations thereof;
(f) generating a graphical document with the application, the dynamic link library, and the document structure file, wherein the graphical document is selected from the group consisting of labels, signs, coupons, tickets, forms, and combinations thereof;
(g) interacting with the graphical document by dynamically altering content thereof, including enabling real time data transformation from one format to .TLD format, independently of the server, using the ActiveX control module; and
(h) printing the graphical document.

2. A non-transitory computer readable storage medium having computer readable instructions stored therein for generating customized graphical documents, said method comprising:
(a) with a client, communicably accessing a server; (b) opening a client-based application;
(c) retrieving document information from the server in the Tattoo Label Design (.TLD) format, the .TLD format being configured to contain graphical components, user-defined formula logic, and user-defined variable content data elements, the user-defined formula logic including logic for translation of data, wherein data is translated between formats selected from a group consisting of English and foreign languages, monetary units, units of measurements, symbols and combinations thereof;
(d) retrieving from the server, an ActiveX control module configured for controlling operational aspects of the application;
(e) at the client, generating a graphical document with the application, the dynamic link library, and the graphical document information;
(f) at the client, interacting with the graphical document by dynamically altering content thereof, using the ActiveX control module, and using data transformation means to allow real time data transformation from one format to another format, wherein one of said formats includes the .TLD format; and (g) printing the graphical document; wherein said interacting, and graphical rendering of the graphical document, is accomplished at the client, independently of the server.

3. The computer readable instructions of claim 2, wherein said retrieving (c) comprises retrieving a document structure file from the server.

4. The computer readable instructions of claim 2, further comprising:
(h) retrieving from the server, a document editing application; and
(i) retrieving from the server, a dynamic link library module configured for use by the application.

5. The computer readable instructions of claim 4, wherein said retrieving (c) comprises retrieving document data from a database at the server.

6. The computer readable instructions of claim 5, wherein the document editing application uses the ActiveX control module and the document data to generate a document structure file.

7. The computer readable instructions of claim 2, wherein said retrieving (c) comprises generating at least one prompt screen at the client, to elicit at least one document reference.

8. The computer readable instructions of claim 7, wherein the document reference is selected from the group consisting of document name, document type, part name, part number, shipping address, and combinations thereof.

9. The computer readable instructions of claim 2, wherein said document comprises a pre-formatted label.

10. The computer readable instructions of claim 9, wherein said interacting (f) comprises incorporating user-supplied information into the label.

11. The computer readable instructions of claim 10, wherein the user-supplied information comprises user-supplied configuration information.

12. The computer readable instructions of claim 2, wherein said printing (g) comprises printing the graphical document with pre-determined and user-defined content.

13. The computer readable instructions of claim 2, wherein said interacting (f) comprises merging user-supplied data into the graphical document.

14. The computer readable instructions of claim 13, wherein said interacting (f) comprises re-formatting the graphical document.

15. The computer readable instructions of claim 13, wherein said interacting (f) comprises re-imaging the graphical document.

16. The computer readable instructions of claim 13, wherein said interacting (f) comprises re-positioning the graphical document on print stock.

17. The computer readable instructions of claim 13, comprising effecting said interacting in real-time.

18. The computer readable instructions of claim 2, wherein the graphical document is selected from the group consisting of labels, signs, coupons, tickets, forms, and combinations thereof.

19. A computer implemented method for generating customized interactive graphical documents between a client computer and a server, said method comprising:
   (a) loading a graphical document information file on a server;
   (b) loading on the server, a dynamic link library module configured for use by a client-based application;
   (c) loading on the server, an ActiveX control module configured for controlling operational aspects of the application;
   (d) communicably coupling the server to a client;
   (e) transmitting the dynamic link library module to the client;
   (f) transmitting the ActiveX control module to the client;
   (g) transmitting the graphical document information file to the client in the Tattoo Label Design (.TLD) format, the .TLD format being configured to contain graphical components, user-defined formula logic, and user-defined variable content data elements, the user-defined formula logic including logic for translation of data, wherein data is translated between formats selected from a group consisting of English and foreign languages, monetary units, units of measurements, symbols and combinations thereof;
   (h) configuring the dynamic link library, and the graphical document information file, to interoperate with a client-based application for generating a graphical document at the client;
   (i) configuring the ActiveX control module to enable interaction with the graphical document at the client by dynamically altering content thereof, including enabling real time data transformation from one format to another format, wherein one of said formats includes the .TLD format, and wherein said generation, and said interaction with the graphical document, including said data transformation, is accomplished at the client, independently of the server.

20. A computer implemented method for generating customized graphical documents between a client computer and a server, said method comprising:
   (a) communicably coupling a server to a client;
   (b) transmitting a dynamic link library module to the client;
   (c) transmitting a graphical document information file to the client in the Tattoo Label Design (.TLD) format, the .TLD format being configured to contain graphical components, user-defined formula logic, and user-defined variable content data elements, the user-defined formula logic including logic for translation of data, wherein data is translated between formats selected from a group consisting of English and foreign languages, monetary units, units of measurements, symbols and combinations thereof;
   (d) the dynamic link library, and graphical document information file, being configured to interoperate with a client-based application for generating a graphical document at the client; (e) transmitting an ActiveX control module to the client;
   (f) the ActiveX control module being configured to enable interaction with the graphical document at the client by dynamically altering content thereof, and allowing real time data transformation from one format to another format, wherein one of said formats includes the .TLD format, and wherein said generating, said interaction with the graphical document, and said data transformation, is accomplished at the client, independently of the server.

21. The method of claim 20 further comprising:
   (g) loading a graphical document information file on a server;
   (h) loading a document editing application on the server;
   (i) loading on the server, a dynamic link library module configured for use by the application;
   (j) loading on the server, an ActiveX control module configured for controlling operational aspects of the client-based application.

22. The method of claim 20, wherein the graphical document information file comprises pre-determined configuration information for the graphical document.

23. A computer system for generating customized graphical documents, said computer system comprising:
   a server including:
   a graphical document information module configured for being transmitted to a client in the Tattoo Label Design (.TLD) format, the .TLD format being configured to contain graphical components, user-defined formula logic, and user-defined variable content data elements, the user-defined formula logic including logic for translation of data, wherein data is translated between formats selected from a group consisting of English and foreign languages, monetary units, units of measurements, symbols and combinations thereof;
   a dynamic link library module configured for being transmitted to the client; an ActiveX control module configured for controlling operational aspects of a client-based application, and configured for being transmitted to the client;
   a client computer communicably coupled to the server;
   said client being configured to:
   download the dynamic link library module, the ActiveX control module, and the graphical document information file; operate the application, the dynamic link library module, the ActiveX control module, and the graphical document information file, to generate a graphical document; and operate the ActiveX control module to enable modification of the content of the graphical document, and real time data transformation from one format to another format, wherein one of said formats includes the .TLD format; wherein said modification, data transformation, and graphical rendering of the graphical document is accomplished at the client, independently of the server.

24. A computer system for generating customized graphical documents, said system comprising a client computer communicably coupled to a server;
   said client including:
   a dynamic link library module; an ActiveX control module; a graphical document information file in the Tattoo Label Design (.TLD) format, the .TLD format being configured to contain graphical components, user-defined formula logic, and user-defined variable content data elements, the user-defined formula logic including logic for translation of data, wherein data is translated between formats selected from a group consisting of English and foreign languages, monetary units, units of measurements, symbols and combinations thereof; and
   an application configured to interoperate with the dynamic link library module, the ActiveX control module, and the graphical document information file, to generate a graphical document, wherein the ActiveX control module is configured to enable modification of the content of the graphical document at the client by dynamically altering content thereof, and to allow real time data transformation from one format to another format, wherein one of said formats includes the .TLD format, and wherein said modification, said data transformation, and graphical rendering of the graphical document are accomplished at the client, independently of the server.

25. An article of manufacture for generating customized graphical documents, said article of manufacture comprising a non-transitory computer readable medium having computer readable program code embodied therein for:

providing a server with a graphical document information module configured for being transmitted to a client in the Tattoo Label Design (.TLD) format, the .TLD format being configured to contain graphical components, user-defined formula logic, and user-defined variable content data elements, the user-defined formula logic including logic for translation of data, wherein data is translated between formats selected from a group consisting of English and foreign languages, monetary units, units of measurements, symbols and combinations thereof;

providing a server with a dynamic link library module configured for being transmitted to the client; providing a server with an ActiveX control module configured for controlling operational aspects of a client-based application, and configured for being transmitted to the client; communicably coupling the server to a client; and transmitting to the client the dynamic link library module, the ActiveX control module, and the graphical document information file; wherein the client may operate the application, the dynamic link library module, the ActiveX control module, and the graphical document information file, to generate, modify content of, allow real time data transformation from one format to another format wherein one of said formats includes the .TLD format, and .print, the graphical document; and wherein the graphical document is generated, modified, data therefor transformed, and printed, at the client, independently of the server.

* * * * *